(12) United States Patent
Meisner et al.

(10) Patent No.: US 11,772,338 B2
(45) Date of Patent: Oct. 3, 2023

(54) COMPOSITE COMPONENT SYSTEM, USE OF A COMPOSITE COMPONENT SYSTEM AND METHOD FOR REPAIRING A COMPOSITE COMPONENT SYSTEM

(71) Applicant: Airbus Defence and Space GmbH, Taufkirchen (DE)

(72) Inventors: Christoph Meisner, Taufkirchen (DE); Thomas Körwien, Taufkirchen (DE); Anton Maier, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 91 days.

(21) Appl. No.: 17/511,088

(22) Filed: Oct. 26, 2021

(65) Prior Publication Data

US 2022/0126537 A1   Apr. 28, 2022

(30) Foreign Application Priority Data

Oct. 28, 2020   (DE) ...................... 10 2020 128 398.9

(51) Int. Cl.
  *B29C 73/06*   (2006.01)
(52) U.S. Cl.
  CPC .................................. *B29C 73/06* (2013.01)
(58) Field of Classification Search
  None
  See application file for complete search history.

(56) References Cited

U.S. PATENT DOCUMENTS

2019/0275755 A1   9/2019   Ihn et al.
2019/0310081 A1*  10/2019  Cenac ................. G01M 5/0091

FOREIGN PATENT DOCUMENTS

| DE | 10 2011 076 463 A1 | 11/2012 |
| DE | 10 2017 101 074 A1 | 7/2018 |
| DE | 10 2017 117 383 A1 | 2/2019 |
| DE | 10 2018 004 711 A1 | 12/2019 |
| DE | 10 2018 129 495 A1 | 5/2020 |
| EP | 1 859 923 A1 | 11/2007 |
| EP | 3 173 219 A1 | 5/2017 |

(Continued)

OTHER PUBLICATIONS

Extended European Search Report for Application No. 21199685 dated Mar. 17, 2022.

(Continued)

*Primary Examiner* — Alexander S Thomas
(74) *Attorney, Agent, or Firm* — KDW Firm PLLC

(57) ABSTRACT

A composite component system includes a base component with a first component fiber ply and a second component fiber ply and a repair insert with a first repair fiber ply and a second repair fiber ply. The base component is connected to the repair insert by an adhesive joint. The first component fiber ply has an interface surface connected to the interface surface of the first repair fiber ply by the adhesive joint. The second component fiber ply has an interface surface connected to the interface surface of the second repair fiber ply by the adhesive joint. The first component fiber ply has a fiber orientation corresponding substantially to a fiber orientation of the first repair fiber ply. The interface surface of the first repair fiber ply completely overlaps the interface surface of the first component fiber ply.

20 Claims, 5 Drawing Sheets

(56) References Cited

FOREIGN PATENT DOCUMENTS

| EP | 3 712 423 A1 | 9/2020 |
|----|--------------|--------|
| WO | WO 2017/081456 A1 | 5/2017 |

OTHER PUBLICATIONS

German Search Report for Application No. 102020128398 dated Oct. 29, 2020.
German Office Action for Application No. 102020128398 dated Jan. 26, 2021.

* cited by examiner

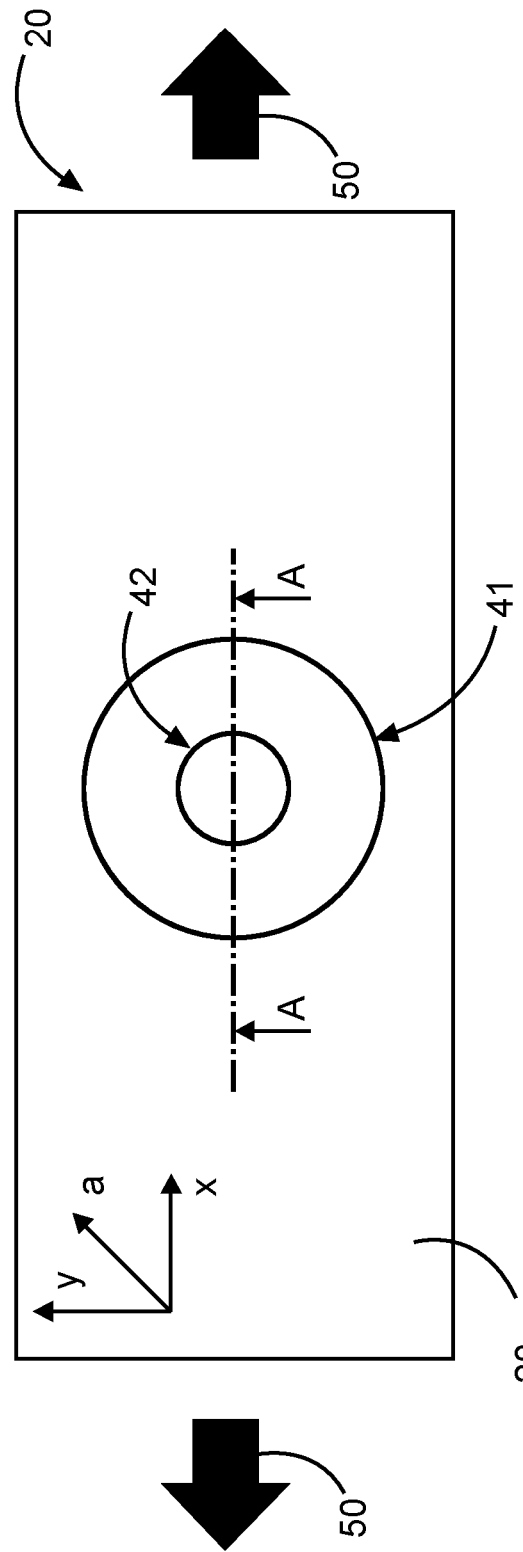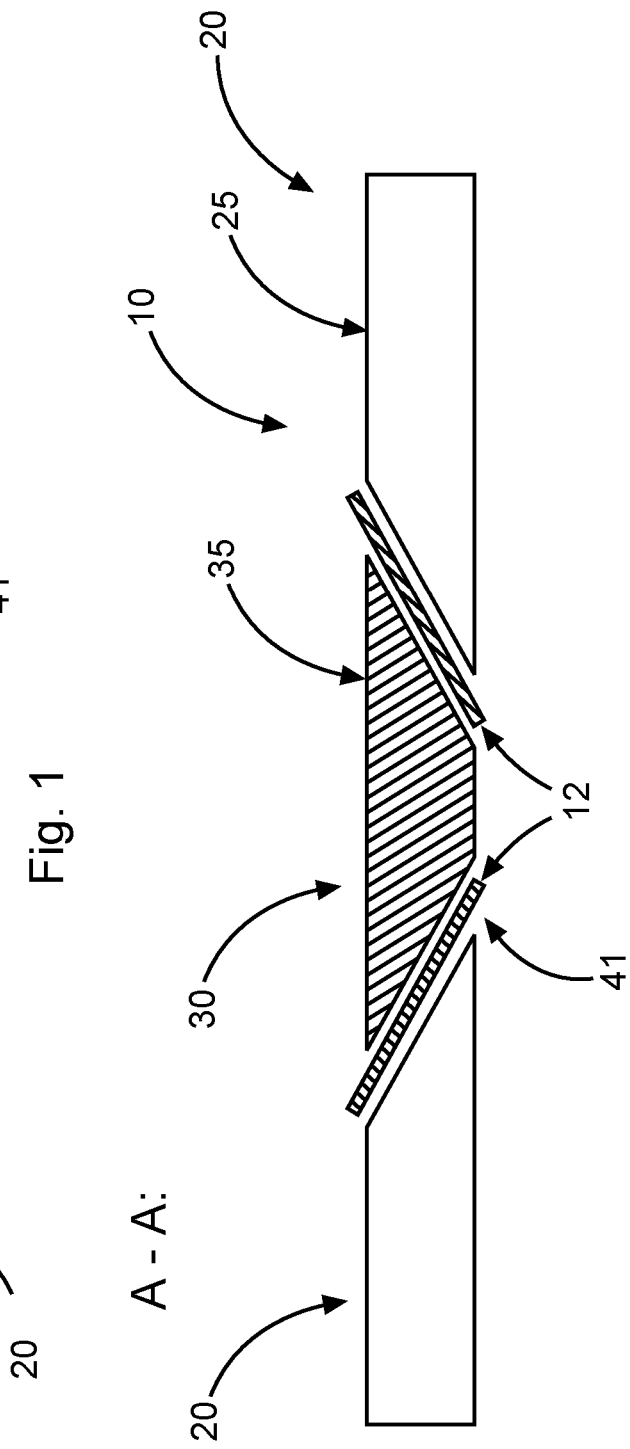

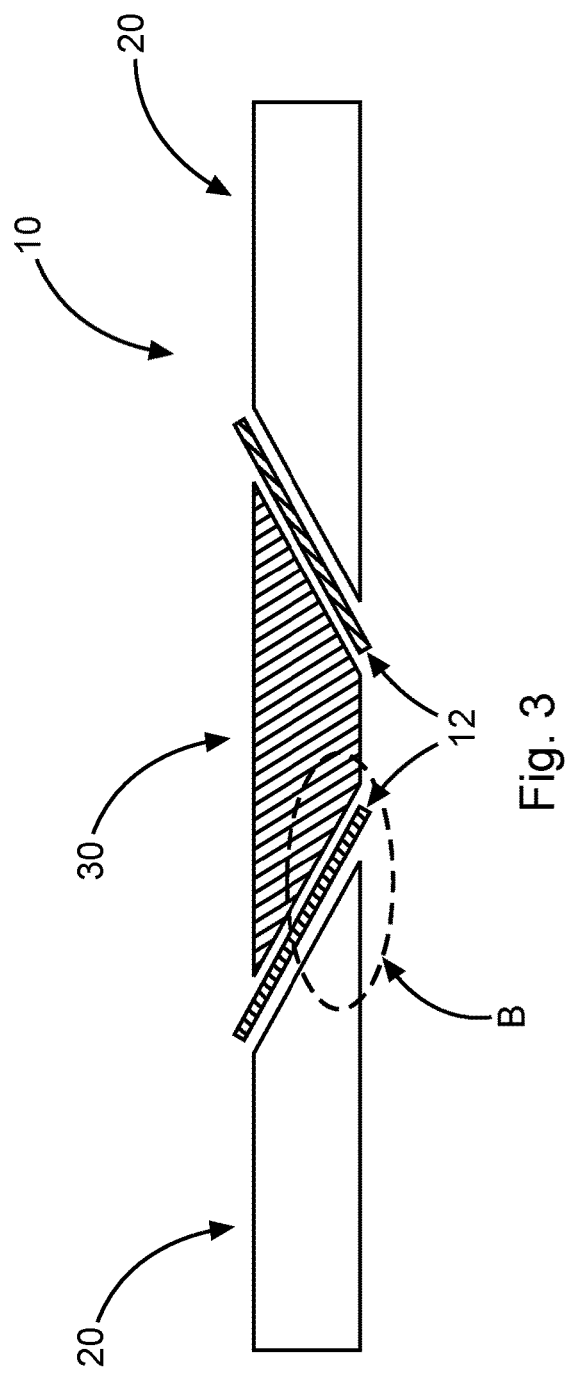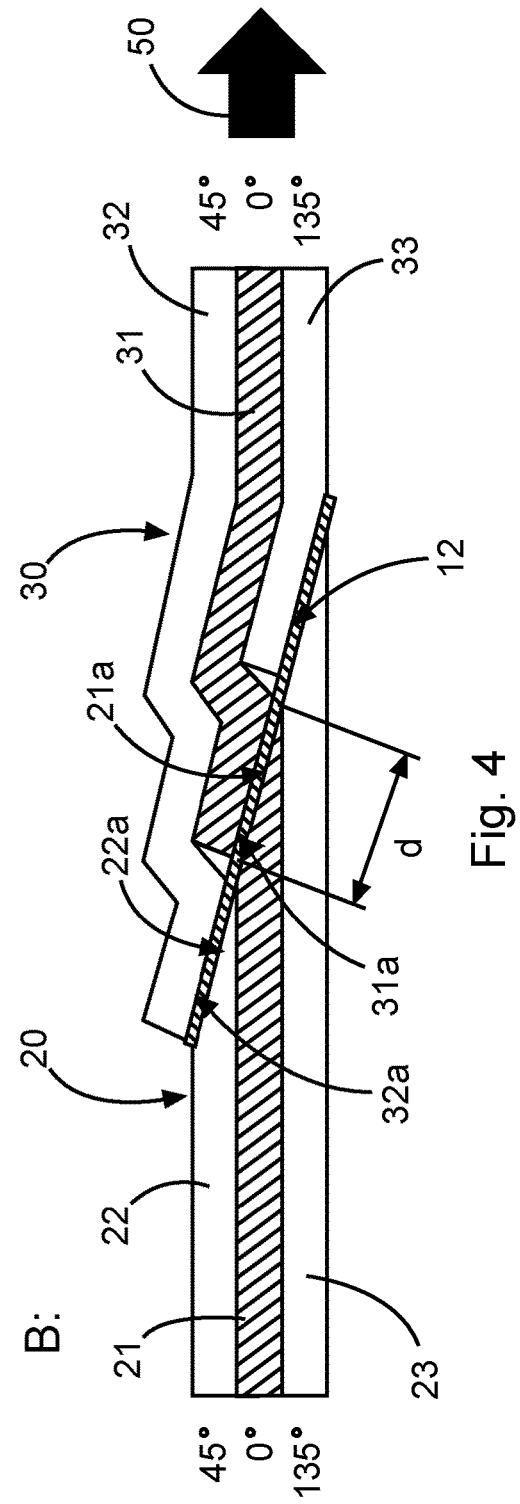

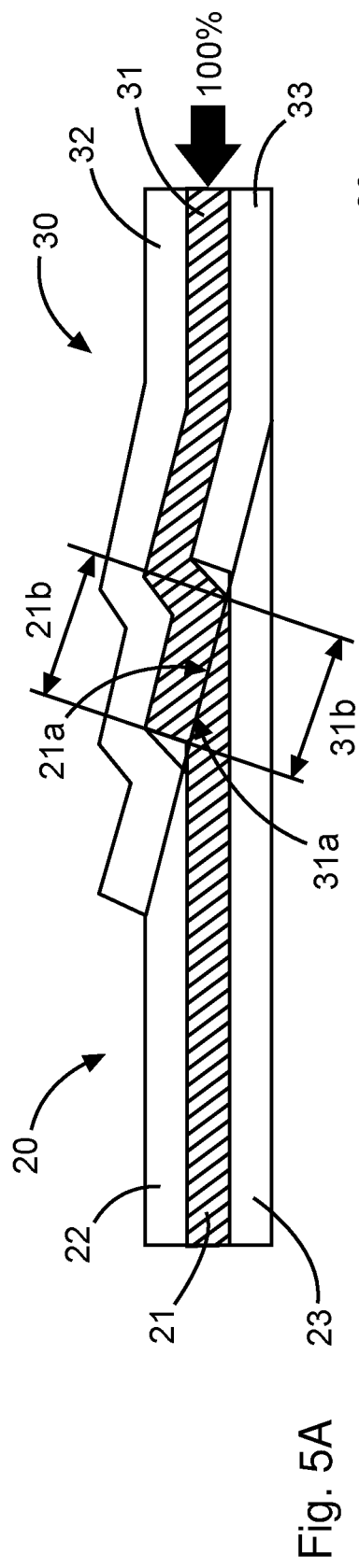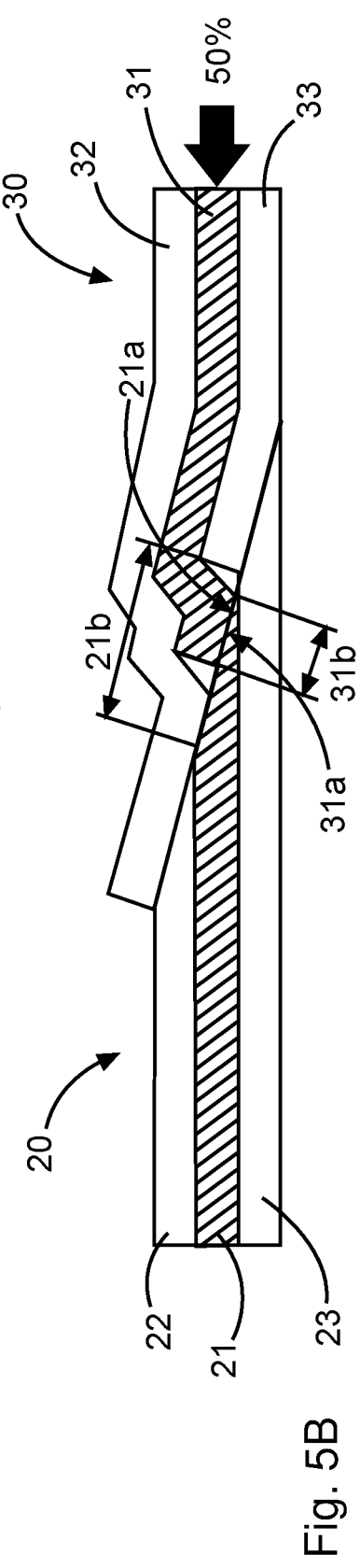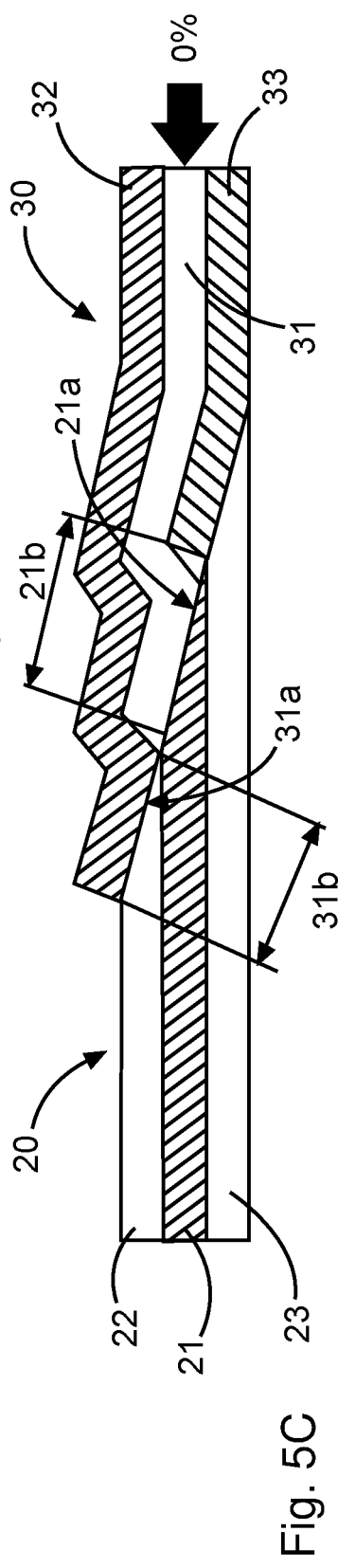

COMPOSITE COMPONENT SYSTEM, USE OF A COMPOSITE COMPONENT SYSTEM AND METHOD FOR REPAIRING A COMPOSITE COMPONENT SYSTEM

CROSS-REFERENCE TO RELATED APPLICATION

This application claims priority to German Patent Application No. 10 2020 128 398.9 filed Oct. 28, 2020, the entire disclosure of which is incorporated by reference herein.

TECHNICAL FIELD

The disclosure herein relates to the repair of fiber composite components. In particular, the disclosure herein relates to a composite component system, to the use of a composite component system, and to a method for repairing a composite component system.

BACKGROUND

Fiber composite components are nowadays used in a multiplicity of technical fields owing to their advantageous properties, such as low weight and high strength. For example, fiber composite components are being used to an ever-increasing extent in vehicle engineering and in aviation engineering. Owing to the often high mechanical stresses of such fiber composite components, it may occasionally happen that damage or damaged areas, such as cracks or holes, occur in the fiber composite component. In this case, it is important to repair or restore these damaged areas in such a way that, following this, the fiber composite component again has a mechanical strength and fatigue resistance corresponding to the requirements. Corresponding repair methods for composite components are often time-consuming and expensive.

DE 10 2017 101 074 A1, for example, describes a method for producing a fiber composite component, wherein a fiber ply is produced by depositing at least two fiber webs in a plane adjacent to one another and along a circular guide arc.

EP 3 173 219 A1 describes a depositing unit for producing a fiber composite component and a method for producing a fiber composite component, having a depositing unit in which the fiber coils are spaced apart laterally from one another.

SUMMARY

It is an object of the disclosure herein to reduce the repair outlay on composite components.

This object is achieved by the disclosure and illustrative embodiments herein.

According to one aspect of the disclosure herein, a composite component system is provided. The composite component system comprises a base component having at least one first component fiber ply and one second component fiber ply as well as a repair insert having at least one first repair fiber ply and one second repair fiber ply. The base component and the repair insert can accordingly be fiber composite components. The base component is connected to the repair insert by an adhesive joint. The first component fiber ply has an interface surface, which lies opposite an interface surface of the first repair fiber ply, with the result that the interface surface of the first component fiber ply is connected to the interface surface of the first repair fiber ply by the adhesive joint. Likewise, the second component fiber ply has an interface surface, which lies opposite an interface surface of the second repair fiber ply, with the result that the interface surface of the second component fiber ply is connected to the interface surface of the second repair fiber ply by the adhesive joint. Furthermore, the first component fiber ply has a fiber orientation which corresponds substantially to a fiber orientation of the first repair fiber ply, and the interface surface of the first repair fiber ply at least completely overlaps the interface surface of the first component fiber ply.

In other words, an overlap of the interface surface of the first component fiber ply by the interface surface of the first repair fiber ply of 100% or more is provided since such an at least complete overlap leads to a higher component strength or fatigue strength than if the overlap were, for example, less than 100%. It is thereby possible to provide a repair site with improved mechanical properties, wherein the overlap is ensured only for what is referred to as the 0° fiber direction, that is to say a main loading direction of the composite component system, which may correspond to the fiber orientation of the first component fiber ply and of the first repair fiber ply. On the other hand, the overlapping of adjacent fiber plies, such as, for example, the degree of overlapping of the interface surface of the second repair fiber ply with respect to the interface surface of the second component fiber ply, can be configured as desired.

This type of overlap is advantageous, particularly in the case of repairs to fiber composite components where individual fiber plies, for example in a damaged area, have to be freshly applied in order to fill in and repair the damaged area. In order to achieve a high and reliable static strength and fatigue strength of repairs with composite joints, the overlapping of the individual plies between the repair insert and the base laminate plays an important role. If the overlap of a fiber ply for a repair insert with straight support is less than 100%, this can lead to a reduction in static strength and fatigue strength. In order to achieve a high and uniform overlap of the plies, the manufacturing outlay for the repair would increase dramatically. Each individual repair ply would have to be measured, designed and cut according to the actual base component geometry. Moreover, the repair insert layers (repair fiber plies) may also move during the application and curing of the repair insert, leading to an overlap of less than 100%. This is avoided by the composite component system described herein, since an overlap of always at least 100% is provided.

Here, the "overlap" can be the extent or the proportion to which the interface surface of the first repair fiber ply covers over or covers up the interface surface of the first component fiber ply. Furthermore, when viewed in cross section, the overlap can be regarded as the extent to which a length of the interface surface of the first repair fiber ply extends over or covers over a length of the interface surface of the first component fiber ply, these lengths in each case being measured along the corresponding interface surfaces or along the adhesive joint.

It should be understood that, during a repair operation, a multiplicity of repair fiber plies or repair fiber layers can be applied in the damaged area and adhesively bonded to the respectively opposite, corresponding component fiber plies or component fiber layers by the adhesive joint. After the repair process, these fiber plies applied during the repair process form the repair insert, which is adhesively bonded to the base component at or in the damaged area. At least for one repair fiber ply, i.e. the first repair fiber ply, provision should be made here for this first repair fiber ply to have an interface surface which at least completely overlaps the interface surface of the opposite, corresponding, first component fiber ply, i.e. overlaps it by at least 100% or even more than 100%. In this case, the overlapping of further repair fiber plies with further, respectively opposite, corresponding component fiber plies can be configured as desired. This makes it possible to provide an improved manufacturing process for the repair insert for insertion into the base component, in that, for example, the minimum overlap is maintained only for the repair fiber ply and the component fiber ply with a 0° fiber orientation. In this case, the 0° fiber orientation can correspond to a main loading direction of the composite component system.

In other words, a repair operation on the base component is improved to the effect that, during the production of the repair insert, in which the repair fiber plies are applied ply by ply, the abovementioned minimum overlap of 100% is ensured only for the 0° fiber plies of the repair component and of the base component. This means that, just for these 0° fiber plies, the repair fiber ply may be made thicker in the region of its interface than the opposite component fiber ply, thus ensuring that the repair fiber ply overlaps the component fiber ply in the region of its interface with the opposite component fiber ply and thus that the interface surface of the repair fiber ply extends beyond the interface surface of the opposite component fiber ply. In this case, the adjacent repair fiber plies (that is to say those lying above or below in the layered structure), for example those having a 45° fiber orientation and/or a 135° fiber orientation, can be made thinner in the region of the interfaces than the respectively opposite component fiber ply. This means that only the thickness of the 0° fiber ply (first fiber ply), whose fibers are preferably aligned in the main loading direction of the composite component system, is increased in such a way that it overlaps at least 100% or more than 100% of its opposite component fiber ply (first component fiber ply). In this way, the static strength and fatigue strength of adhesively bonded repair joints can be significantly increased using fiber-layered repair inserts in composite components. In addition, with such an arrangement, complex three-dimensional repair geometries, for example curved or multiply curved geometries or nested geometries, can be produced more simply with the desired static strength and fatigue strength. Furthermore, the repair method itself is made more reliable and the repair time is shortened since complex measurements on the ply structure of the repair insert can be avoided.

Thus, at least one repair fiber ply, for example the first repair fiber ply, is applied in the damaged area in such a way that, on account of its geometric extent, this fiber ply at least completely overlaps the corresponding fiber ply in the base component to be repaired, that is to say the first component fiber ply. It is characteristic of the first component fiber ply that the fiber orientation of the fibers located therein corresponds substantially to the fiber orientation of the fibers located in the first repair fiber ply. In particular, the fiber orientation of the fibers in the first component fiber ply is the same as the fiber orientation of the fibers in the first repair fiber ply.

The base component can be any desired component, for example a structural component or the like. If a damaged area has arisen, for example owing to excessive stress on the base component, the repair insert can be formed in or on the base component in a repair operation in order to restore or close the damaged area. This is preferably done by applying the repair insert ply by ply in the form of a pre-impregnated semi-finished product (prepreg) at the damaged area. The damaged area may have been caused by excessive stresses on the base component, for example. A damaged area can comprise a delamination, a fiber breakage or any cracks in the matrix material, for example.

Since the base component can be a laminar composite with stacked fiber plies, the individual fiber plies of the repair insert are applied in such a way that at least the first repair fiber ply of the repair insert is located approximately at the level of the opposite first component fiber ply, with the result that the interface surface of the first repair fiber ply lies opposite the interface surface of the first component fiber ply, with the result that these two fiber plies can be adhesively bonded to one another when the adhesive joint is formed, specifically in such a way that the interface surface of the first repair fiber ply overlaps, that is to say covers up or covers over, the interface surface of the first component fiber ply by at least 100%. Conversely, in particular, no interface surface of a repair fiber ply other than the interface surface of the first repair fiber ply lies opposite the interface surface of the first component fiber ply.

An "interface surface of a component fiber ply" can be understood as a surface which is formed when a fiber ply of the base component is cut open, thus forming a cut open fiber ply of the base component that forms, for example, a fracture surface of a fiber layer of a fiber composite. This may be the case, for example, in the region of a damaged area in a laminar composite component or a fiber laminate.

An "interface surface of a repair fiber ply" can be understood to mean a surface which, for example, represents the end of a fiber ply of a laminar composite when such a laminar composite is being produced. This can be a region where the fibers of a fiber ply end. This will be explained in greater detail in the description of the figures.

According to one embodiment, the interface surface of the first repair fiber ply extends beyond the interface surface of the first component fiber ply.

This means that the interface surface of the first repair fiber ply overlaps the interface surface of the first component fiber ply by more than 100%. An illustrative overlap could be at least 120%, at least 150% or even at least 180%. In this case, the overlap can be proportional to the size ratio of the interface area of the first repair fiber ply to the interface area of the opposite first component fiber ply.

The interface surface of the first repair fiber ply can extend beyond the interface surface of the first component fiber ply, e.g. along a direction of extent of the adhesive joint. In this case, the adhesive joint is formed between the interface surfaces of respectively opposite fiber plies and thus extends along or in the plane of the interface surfaces.

In other words, the interface surface of the first repair fiber ply can be larger than the interface surface of the first component fiber ply, and therefore parts of the interface surface of the first repair fiber ply already lie opposite interface surfaces of further component fiber plies which are arranged next to or adjacent to the first component fiber ply in the laminar composite.

According to a further embodiment, the interface surface of the second component fiber ply overlaps the interface surface of the second repair fiber ply at least completely, in particular by 100% or more than 100%.

This can be the result of the interface surface of the first repair fiber ply overlapping the interface surface of the first component fiber ply by 100% or by more than 100%, as a result of which the interface surface of the second repair fiber ply next to the first repair fiber ply is reduced.

According to another embodiment, the interface surface of the second component fiber ply extends beyond the interface surface of the second repair fiber ply.

This can be the result of the fact that the interface surface of the first repair fiber ply extends beyond the interface surface of the first component fiber ply since the interface surface of the second repair fiber ply next to the first repair fiber ply is reduced. These relationships can be seen even more clearly in the description of the figures.

According to another embodiment, the first component fiber ply has fibers which extend in a main loading direction of the composite component system, and the first repair fiber ply comprises fibers which likewise extend in the main loading direction of the composite component system.

The main loading direction can be a direction along which the greatest force which is exerted on the base component or the composite component system during an operating state acts. Such a force or load can be a compressive force or a tensile force, the maximum of which points in the direction of the main loading direction. In directions which differ from the main loading direction, a force acting on the base component or the composite component system may be smaller than the force which acts along the main loading direction.

Here, the main loading direction can be defined by what is referred to as a 0° direction. The direction of extent of the fibers in a fiber ply can represent the fiber orientation of the respective fiber ply. This means that almost all the fibers in the first component fiber ply and almost all the fibers in the first repair fiber ply are oriented in the main loading direction, i.e. in the 0° direction. However, it should be understood that, in addition to a 0° orientation of the fibers, other directions that differ from 0° can also be considered as the main loading direction as long as the direction of extent of the fibers in the first repair fiber ply corresponds to the direction of extent of the fibers in the first component fiber ply.

The repair fiber plies can be introduced into the damaged area in such a way that in each case opposite fiber plies of the repair insert and of the base component have the same fiber orientation. This same fiber orientation of opposite fiber plies after the application of the layers of the repair insert to the damaged area of the base component results in increased strength. In this case, the strength after the repair can be optimized, in particular, by the interface of the first repair fiber ply, which overlaps the interface of the first component fiber ply by at least 100%, but preferably by even more than 100%, in each case having the same fiber orientations.

According to another embodiment, the second component fiber ply has fibers which extend in a direction which differs from the main loading direction, and the second repair fiber ply comprises fibers which extend in the direction which differs from the main loading direction.

In this case, this differing direction can be defined by what is referred to as a 45° direction, 90° direction or 135° direction. The direction of extent of the fibers can represent the fiber orientation in the respective fiber ply. This means that almost all the fibers in the second component fiber ply and almost all the fibers in the second repair fiber ply are oriented in the 45° direction, 90° direction or 135° direction. Here too, it should be understood that, in addition to a 45° direction, 90° direction or 135° direction of the fibers, other directions which are different from these values come into consideration as directions of extent of the fibers for the second repair fiber ply and the second component fiber ply as long as the direction of extent of the fibers in the second repair fiber ply corresponds to the direction of extent of the fibers in the second component fiber ply.

According to a further embodiment, the base component has a laminate structure which comprises at least the first component fiber ply and the second component fiber ply. In addition or as an alternative, the repair insert can have a laminate structure which comprises at least the first repair fiber ply and the second repair fiber ply.

Thus, a damaged area in the base component, which itself has a laminar composite, is filled by a repair insert which likewise forms a laminar composite in order to keep structural differences between the base component and the repaired area, that is to say the repair insert, as small as possible.

According to a further embodiment, the laminate structure has at least one further component fiber ply and one further repair fiber ply.

The further component fiber ply can be referred to as a third component fiber ply, and the further repair fiber ply can be referred to as a third repair fiber ply. For example, the laminate structure may be designed in such a way that the first component fiber ply lies between the second and the third component fiber ply, and that the first repair fiber ply lies between the second and the third repair fiber ply. It should be understood that any number of further component fiber plies can be arranged in the laminate structure of the base component and any number of further repair fiber plies can be arranged in the laminate structure of the repair insert.

In one example, the fiber orientation of the first component fiber ply and of the first repair fiber ply is equal to a 0° direction or equal to a main load direction of the composite component system, while the fiber orientation of the second component fiber ply and the opposite second repair fiber ply are equal to a 45° direction, and the fiber orientation of the third component fiber ply and the opposite third repair fiber ply are equal to a 135° direction. The individual component fiber plies or repair fiber plies can have a thickness of about ⅛ mm. However, other thicknesses are possible.

According to another embodiment, the repair insert can be inserted into an aperture in the base component, with the result that an outer surface of the repair insert and an outer surface of the base component end flush with one another.

As mentioned above, the repair insert can be inserted into the aperture ply by ply. The uppermost ply of the repair insert can end flush with the uppermost ply of the base component, thus enabling a flat surface of the repaired base component to be provided. Provision can furthermore be made for a Doppler ply to be applied to this flush, flat surface.

During a repair operation, a damaged area can be removed from the base component by creating the aperture which includes the damaged area, for example by cutting out or milling out or scarfing a relatively large region of the base component around the damaged area. This aperture can have a frustoconical shape. The aperture can be provided in the form of a blind hole in the base component. This means that the aperture does not have to pass completely through the base component, for example. The repair insert, which is composed of a plurality of repair fiber plies and is applied ply by ply during the repair, can likewise have a scarfed shape or frustoconical shape which fits into the aperture in the base component. However, it is possible for two base components to be connected by the repair insert, such that the repaired area does not form an aperture in the base component, but rather a joint, as is the case with a butt joint. The repair insert is then arranged or inserted between the two base components to be connected, wherein the features of the composite component system described above and below apply analogously.

According to one aspect of the disclosure herein, use of a composite component system as described above and below in a vehicle is envisaged. The vehicle can be a ground vehicle or an aircraft, for example.

According to one aspect of the disclosure herein, a method for repairing a composite component system is specified. In one step of the method, a base component having at least one first component fiber ply and one second component fiber ply is provided, wherein the first component fiber ply has an interface surface and the second component fiber ply has an interface surface. In a further step, a first repair fiber ply and a second repair fiber ply are provided, wherein the first repair fiber ply has an interface surface and the second repair fiber ply has an interface surface. In a further step, the base component, the first repair fiber ply and the second repair fiber ply are arranged in such a way that the interface surface of the first component fiber ply lies opposite the interface surface of the first repair fiber ply and that the interface surface of the second component fiber ply lies opposite the interface surface of the second repair fiber ply. In this case, the first component fiber ply has a fiber orientation which corresponds substantially to a fiber orientation of the first repair fiber ply. In a further step, the base component, the first repair fiber ply and the second repair fiber ply are adhesively bonded, such that the interface surface of the first component fiber ply is connected to the interface surface of the first repair fiber ply via the adhesive joint, and such that the interface surface of the second component fiber ply is connected to the interface surface of the second repair fiber ply via the adhesive joint. In this case, the interface surface of the first repair fiber ply at least completely overlaps the interface surface of the first component fiber ply. The steps mentioned can be carried out in any order or in the order listed here.

In an optional step, the first repair fiber ply and the second repair fiber ply are arranged by applying the first repair fiber ply before applying the second repair fiber ply, wherein, after being applied, the first repair fiber ply and the second repair fiber ply together form a repair insert.

BRIEF DESCRIPTION OF THE DRAWINGS

FIG. 1 shows a plan view of a base component having an aperture according to one example embodiment of the disclosure herein.

FIG. 2 shows a sectional view of a composite component system having the base component shown in FIG. 1 and a repair insert according to one example embodiment of the disclosure herein.

FIG. 3 shows the composite component system from FIG. 2 according to another example embodiment of the disclosure herein.

FIG. 4 shows a detail view of an arrangement of fiber plies of a composite component system according to one example embodiment of the disclosure herein.

FIGS. 5A, 5B and 5C show detail views of fiber plies of a composite component system with different overlaps of respectively opposite fiber plies according to one example embodiment of the disclosure herein.

DETAILED DESCRIPTION

Figure 6:
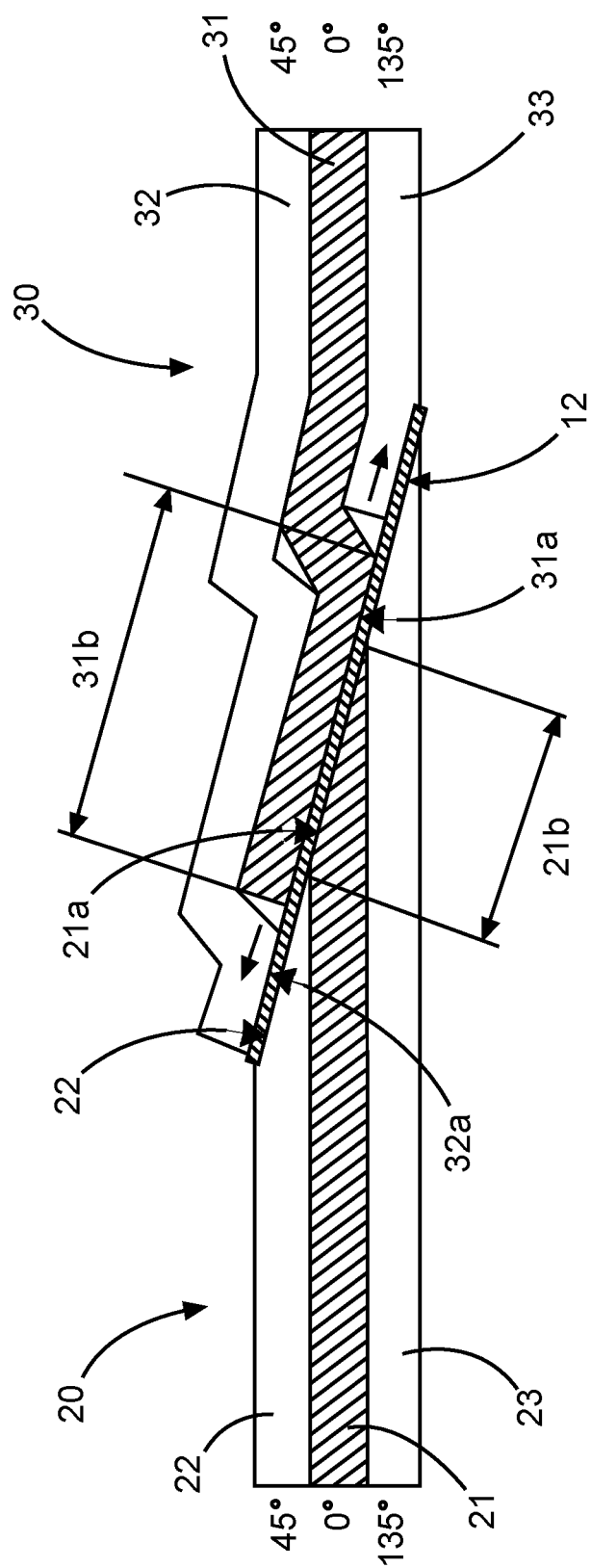
FIG. 6 shows a detail view of a more than 100 percent overlap of a first repair fiber ply with respect to a first component fiber ply, according to one example embodiment of the disclosure herein.

The illustrations in the figures are schematic and not to scale. If the same reference signs are used in different figures in the following description of the figures, they designate identical or similar elements. However, identical or similar elements can also be designated by different reference symbols.

FIG. 1 shows a plan view of a base component 20 having an aperture 41. The aperture 41 has a scarfed shape or frustoconical shape, as can be seen in the sectional view A-A of FIG. 2. It should be noted that this shape is only as an example here and other aperture shapes are possible. The aperture 41 can be made, for example, by milling out or cutting out a corresponding material region of the base component 20. The aperture 41 surrounds a region in which a damaged area 42 was located in the base component 20. By producing the aperture 41, the entire damaged area 42 has thus been removed from the base component 20. The thick arrows in FIG. 1 represent a main loading direction 50 of a main load acting on the base component, which has led to the damaged area 42.

FIG. 2 shows the sectional view A-A of a section through the base component 20 parallel to the main loading direction 50. FIG. 2 furthermore shows a repair insert 30 in the aperture 41 of the base component 20, and therefore FIG. 2 shows a schematic illustration of a repaired state of the base component 20. The base component 20 and the repair insert 30 thus together form the composite component system 10. Provision can be made, after repair of the base component 20, for an outer surface 25 of the base component 20 to end flush with an outer surface 35 of the repair insert 30 in order thus to form a flat surface of the composite component system 10. It can furthermore be seen in FIG. 2 that the repair insert 30 is connected, i.e. adhesively bonded, to the base component 20 via an adhesive joint 12 or an adhesive layer 12.

FIG. 3 once again shows the composite component system 10 illustrated in FIG. 2, wherein the section B of the composite component system 10 is illustrated on an enlarged scale in FIG. 4.

As can be seen in FIG. 4, the composite component system 10 has the base component 20 having at least one first component fiber ply 21 and one second component fiber ply 22 as well as the repair insert 30 having at least one first repair fiber ply 31 and one second repair fiber ply 32. The base component 20 is connected to the repair insert 30 by the adhesive joint 12. The first component fiber ply 21 has an interface surface 21a, which lies opposite an interface surface 31a of the first repair fiber ply 31, with the result that the interface surface 21a of the first component fiber ply 21 is connected to the interface surface 31a of the first repair fiber ply 31 by the adhesive joint 12. Here, the interface surfaces 21a, 31a can be understood as the end region of the respective fiber plies. For example, the fibers of the first repair fiber ply 31 end at the interface surface 31a and the fibers of the first component fiber ply 21 end at the interface surface 21a. The two interface surfaces 21a, 31a can be located opposite one another in such a way that only the adhesive joint 12 or adhesive layer 12 is arranged between them.

As illustrated in FIG. 4, the alignment or extent of the adhesive joint can enclose an acute angle with the main loading direction 50, which, however, may be illustrated only schematically, that is to say in a greatly exaggerated way, in the figures.

The second component fiber ply 22 can also have an interface surface 22a, which lies opposite an interface surface 32a of the second repair fiber ply 32, with the result that the interface surface 22a of the second component fiber ply 22 is connected to the interface surface 32a of the second repair fiber ply 32 by the adhesive joint 12.

In the region of the interfaces 21a, 31a of the first repair fiber ply 31 or first component fiber ply 21, an illustrative overlap is shown. In the example illustrated there, the overlap with which the interface surface 31a overlaps the interface surface 21a is 100%. The overlap region d is illustrated in FIG. 4. According to the disclosure herein, however, this overlap can be more than 100%, which will be explained in more detail with reference to FIG. 6. In the example illustrated in FIG. 4, the overlap is 100% for all opposite interface surfaces. In particular, the interface surface 32a of the second repair fiber ply 32 also overlaps the interface surface 22a of the second component fiber ply 22a by 100%.

FIG. 4 furthermore illustrates illustrative fiber orientations in addition to the respective fiber plies. In the example illustrated there, the fiber orientation of the first component fiber ply 21 and of the first repair fiber ply 31 is in each case 0°, which corresponds substantially to the x-direction or main loading direction 50 illustrated in FIG. 1. The fiber orientation of the second component fiber ply 22 and of the second repair fiber ply 32 is in each case 45°, which corresponds substantially to the a-direction illustrated in FIG. 1.

FIG. 4 furthermore shows a third component fiber ply 23 and a third repair fiber ply 33, which are located opposite one another in the region of the adhesive joint 12. The fiber orientation of the third component fiber ply 23 and the third repair fiber ply 33 is in each case 135°, which corresponds substantially to a direction which extends perpendicular to the a-direction illustrated in FIG. 1. It should be noted that these are merely illustrative combinations of directions of the individual fiber plies and further combinations of directions come into consideration.

FIGS. 5A, 5B and 5C show various overlaps with which the interface surface 31a of the first repair fiber ply 31 overlaps the interface surface 21a of the first component fiber ply 21. The overlap can be regarded as the extent or the proportion to which the interface surface 31a of the first repair fiber ply 31 covers over or covers up the interface surface 21a of the first component fiber ply 21. Furthermore, when viewed in the cross section, the overlap can be regarded as the extent to which the length 31b of the interface surface 31a of the first repair fiber ply 31 passes over or covers over the length 21b of the interface surface 21a of the first component fiber ply 21, wherein the lengths 21b, 31b are in each case measured along the corresponding interface surfaces 21a, 31a or 22a, 32a or along the adhesive joint (not illustrated) or along the scarfing angle of the aperture 41. The overlap can therefore also be regarded as the ratio in which the length 31b overlaps or overlaps the length 21b.

FIGS. 5A-5C illustrate three illustrative overlaps. In FIG. 5A, the overlap is approximately 100%, in FIG. 5B approximately 50%, and in FIG. 5C 0%. As will now be explained below with reference to FIG. 6, the composite component system 10 according to the disclosure herein is intended to provide an at least complete, that is to say an at least 100%, overlap of the first of the interface surfaces 31a of the first repair fiber ply 31 with respect to the interface surface 21a of the first component fiber ply 21.

FIG. 6, in particular, shows a detail view of a more than 100 percent overlap of the first repair fiber ply 31 with respect to a first component fiber ply 21, in particular a more than 100 percent overlap of the first of the interface surfaces 31a of the first repair fiber ply 31 with respect to the interface surface 21a of the first component fiber ply 21. This means that the length 31b of the interface surface 31a of the first repair fiber ply 31 in the cross section of the composite component system 10 extends beyond the length 21b of the interface surface 21a of the first component fiber ply 21.

It should be understood that during the production of the repair insert 30, in which the repair fiber plies 31, 32, 33 are applied ply by ply, the abovementioned overlap of more than 100% is ensured only for the 0° fiber plies of the repair insert 30 and of the base component 20, while the overlap of the further fiber plies can be any desired. Provision can thus be made for the repair fiber ply 31 to have a larger dimension than the component fiber ply 21 in the region of the interfaces 21a, 31a only for these 0° fiber plies 21, 31, while the adjacent second repair fiber ply 32 has a smaller dimension in the region of the interfaces 22a, 32a than its opposite second component fiber ply 22 and while the adjacent third repair fiber ply 33 has a smaller dimension in the region of the interfaces 23a, 33a than its opposite third component fiber ply 23.

Thus, the interface surface 31a of the first repair fiber ply 31 can extend beyond the interface surface 21a of the first component fiber ply 21, and at the same time, conversely, the interface surface 22a of the second component fiber ply 22 can extend beyond the interface surface 32a of the second repair fiber ply 32. The direction of extent of the interface surfaces 21a, 31a, 22a, 32a, to which this view refers, can be represented by the longitudinal direction of extent of the adhesive joint 12 or the direction of extent of the scarfing of the aperture 41 in the base component 21. In particular, the direction of extent of the interface surfaces 21a, 31a, 22a, 32a, along which the overlap is measured, can refer to the illustration of section A-A in FIGS. 1 and 2. Furthermore, provision can be made for the at least 100 percent or the more than 100 percent overlap of the interface surface 31a of the repair fiber ply 31 with respect to the interface surface 21a of the first component fiber ply 21 to be provided in the same way for further layers of the composite component system 10. In particular, this at least 100 percent or the more than 100 percent overlap may apply to two, three or a multiplicity of interfaces within the composite component system 10.

In any case, the composite component system 10 according to the disclosure herein aims, inter alia, to enable the thickness of the repair fiber plies for the 45° direction, the 135° direction, the 90° direction or any other direction apart from the 0° repair fiber ply (first repair fiber ply 31) to be reduced in order to avoid overlapping of these repair fiber plies with the 0° component fiber ply (first component fiber ply 21) in the region of the interface 21a. On the other hand, a dimension of the repair fiber ply 31 with fiber orientation in the 0° direction (main loading direction) is increased, with the result that the first repair fiber ply 31, in particular its interface surface 31a, overlaps the component fiber ply 21 or its interface surface 21a by 100% or more than 100%, as illustrated in FIG. 6.

Figure 7:
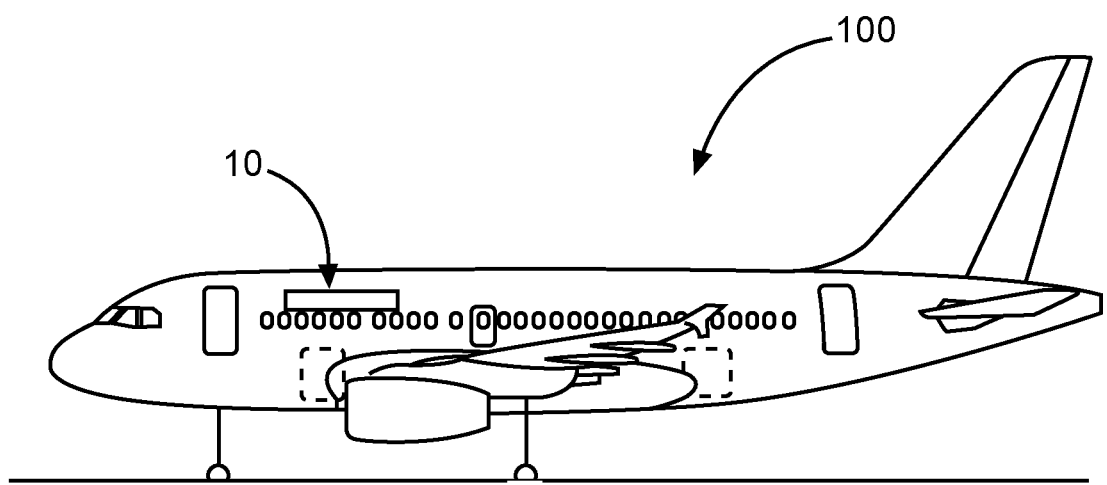
FIG. 7 shows a vehicle having a composite component system according to one example embodiment of the disclosure herein.

FIG. 7 shows an aircraft 100 with the composite component system 10 according to the disclosure herein, as illustrated, for example, in FIG. 6. In this case, the composite component system 10 can be, for example, a structural element of the aircraft 100.

Figure 8:
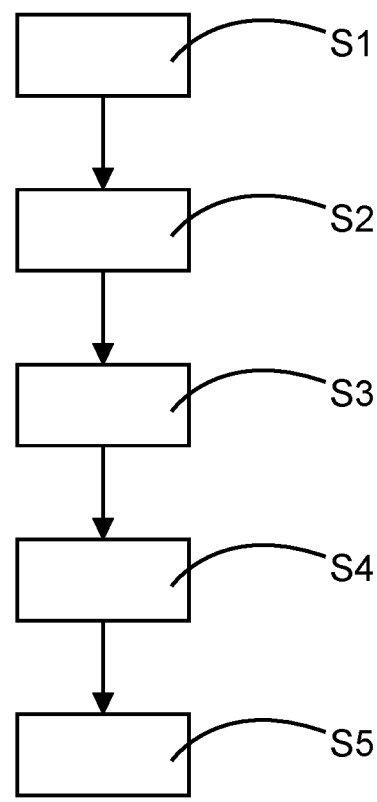
FIG. 8 shows a flow diagram of a method for repairing a composite component system according to one example embodiment of the disclosure herein.

FIG. 8 shows a flow diagram of a method for repairing a composite component system 10. In one step of the method S1, a base component 20 having at least one first component fiber ply 21 and one second component fiber ply 22 is provided, wherein the first component fiber ply 21 has an interface surface 21a and the second component fiber ply 22 has an interface surface 22a. In a further step S2, a first repair fiber ply 31 and a second repair fiber ply 32 are provided, wherein the first repair fiber ply 31 has an interface surface 31a and the second repair fiber ply 32 has an interface surface 32a. In a further step S3, the base component 20, the first repair fiber ply 31 and the second repair fiber ply 32 are arranged in such a way that the interface surface 21a of the first component fiber ply 21 lies opposite the interface surface 31a of the first repair fiber ply 31 and that the interface surface 22a of the second component fiber ply 22 lies opposite the interface surface 32a of the second repair fiber ply 32. In this case, the first component fiber ply 21 has a fiber orientation which corresponds substantially to a fiber orientation of the first repair fiber ply 31. In a further step S4, the base component 20, the first repair fiber ply 31 and the second repair fiber ply 32 are adhesively bonded, such that the interface surface 21a of the first component fiber ply 21 is connected to the interface surface 31a of the first repair fiber ply 31 via the adhesive joint 12, and such that the interface surface 22a of the second component fiber ply 22 is connected to the interface surface 32a of the second repair fiber ply 32 via the adhesive joint 12. In this case, the interface surface 31a of the first repair fiber ply 31 at least completely overlaps the interface surface 21a of the first component fiber ply 21.

In an optional step S5, the first repair fiber ply 31 and the second repair fiber ply 32 are arranged by applying the first repair fiber ply 31 before applying the second repair fiber ply 32, wherein, after being applied, the first repair fiber ply 31 and the second repair fiber ply 32 together form a repair insert 30. Provision can be made for step S5 to take place before or during step S3.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A composite component system comprising:
   a base component having at least one first component fiber ply and one second component fiber ply;
   a repair insert having at least one first repair fiber ply and one second repair fiber ply;
   wherein the base component is connected to the repair insert by an adhesive joint;
   the first component fiber ply comprising an interface surface, which lies opposite an interface surface of the first repair fiber ply, wherein the interface surface of the first component fiber ply is connected to the interface surface of the first repair fiber ply by the adhesive joint;
   the second component fiber ply comprising an interface surface, which lies opposite an interface surface of the second repair fiber ply, wherein the interface surface of the second component fiber ply is connected to the interface surface of the second repair fiber ply by the adhesive joint;
   the first component fiber ply comprising a fiber orientation which corresponds substantially to a fiber orientation of the first repair fiber ply;
   wherein the interface surface of the first repair fiber ply at least completely overlaps the interface surface of the first component fiber ply; and
   wherein the interface surface of the first repair fiber ply extends beyond the interface surface of the first component fiber ply.

2. The composite component system according to claim 1, wherein the interface surface of the second component fiber ply completely overlaps the interface surface of the second repair fiber ply.

3. The composite component system according to claim 1, wherein:
   the first component fiber ply comprises fibers extending in a main loading direction of the composite component system; and
   the first repair fiber ply comprises fibers which extend in the main loading direction of the composite component system.

4. The composite component system according to claim 3, wherein:
   the second component fiber ply comprises fibers extending in a direction which differs from the main loading direction; and
   the second repair fiber ply comprises fibers which extend in the direction which differs from the main loading direction.

5. The composite component system according to claim 1, wherein:
   the base component has a laminate structure which has at least the first component fiber ply and the second component fiber ply; and/or
   the repair insert has a laminate structure which has at least the first repair fiber ply and the second repair fiber ply.

6. The composite component system according to claim 1, wherein the laminate structure has at least one further component fiber ply and one further repair fiber ply.

7. The composite component system according to claim 1, wherein:
   the repair insert can be inserted into an aperture in the base component; and
   an outer surface of the repair insert and an outer surface of the base component end flush with one another.

8. A method of using a composite component system according to claim 1 in a vehicle.

9. A composite component system comprising:
   a base component having at least one first component fiber ply and one second component fiber ply;
   a repair insert having at least one first repair fiber ply and one second repair fiber ply;
   wherein the base component is connected to the repair insert by an adhesive joint;
   the first component fiber ply comprising an interface surface, which lies opposite an interface surface of the first repair fiber ply, wherein the interface surface of the first component fiber ply is connected to the interface surface of the first repair fiber ply by the adhesive joint;

the second component fiber ply comprising an interface surface, which lies opposite an interface surface of the second repair fiber ply, wherein the interface surface of the second component fiber ply is connected to the interface surface of the second repair fiber ply by the adhesive joint;

the first component fiber ply comprising a fiber orientation which corresponds substantially to a fiber orientation of the first repair fiber ply;

wherein the interface surface of the first repair fiber ply at least completely overlaps the interface surface of the first component fiber ply; and wherein the interface surface of the second component fiber ply extends beyond the interface surface of the second repair fiber ply.

10. The composite component system according to claim 9, wherein:

the first component fiber ply comprises fibers extending in a main loading direction of the composite component system; and the first repair fiber ply comprises fibers which extend in the main loading direction of the composite component system.

11. The composite component system according to claim 10, wherein:

the second component fiber ply comprises fibers extending in a direction which differs from the main loading direction; and the second repair fiber ply comprises fibers which extend in the direction which differs from the main loading direction.

12. The composite component system according to claim 9, wherein:

the interface surface of the second component fiber ply completely overlaps the interface surface of the second repair fiber ply; or the laminate structure has at least one further component fiber ply and one further repair fiber ply; or the repair insert can be inserted into an aperture in the base component, an outer surface of the repair insert and an outer surface of the base component ending flush with one another.

13. The composite component system according to claim 9, wherein:

the base component has a laminate structure which has at least the first component fiber ply and the second component fiber ply; and/or the repair insert has a laminate structure which has at least the first repair fiber ply and the second repair fiber ply.

14. A method of using a composite component system according to claim 9 in a vehicle.

15. A method for repairing a composite component system, the method comprising:

providing a base component having at least one first component fiber ply and one second component fiber ply, wherein the first component fiber ply has an interface surface and the second component fiber ply has an interface surface;

providing a first repair fiber ply and a second repair fiber ply, wherein the first repair fiber ply has an interface surface and the second repair fiber ply has an interface surface;

arranging the base component, the first repair fiber ply and the second repair fiber ply such that the interface surface of the first component fiber ply lies opposite the interface surface of the first repair fiber ply and that the interface surface of the second component fiber ply lies opposite the interface surface of the second repair fiber ply;

wherein the first component fiber ply has a fiber orientation which corresponds substantially to a fiber orientation of the first repair fiber ply;

adhesively bonding the base component, the first repair fiber ply and the second repair fiber ply, such that the interface surface of the first component fiber ply is connected to the interface surface of the first repair fiber ply via the adhesive joint, and such that the interface surface of the second component fiber ply is connected to the interface surface of the second repair fiber ply via the adhesive joint;

wherein the interface surface of the first repair fiber ply at least completely overlaps the interface surface of the first component fiber ply; and wherein:

the interface surface of the first repair fiber ply extends beyond the interface surface of the first component fiber ply; or the interface surface of the second component fiber ply extends beyond the interface surface of the second repair fiber ply.

16. The method according to claim 15, comprising arranging the first repair fiber ply and the second repair fiber ply by applying the first repair fiber ply before applying the second repair fiber ply, and wherein, after being applied, the first repair fiber ply and the second repair fiber ply together form a repair insert.

17. The method according to claim 15, wherein:

the first component fiber ply comprises fibers extending in a main loading direction of the composite component system; and the first repair fiber ply comprises fibers which extend in the main loading direction of the composite component system.

18. The method according to claim 17, wherein:

the second component fiber ply comprises fibers extending in a direction which differs from the main loading direction; and the second repair fiber ply comprises fibers which extend in the direction which differs from the main loading direction.

19. The method according to claim 16, wherein:

the interface surface of the second component fiber ply completely overlaps the interface surface of the second repair fiber ply; or the laminate structure has at least one further component fiber ply and one further repair fiber ply; or the repair insert can be inserted into an aperture in the base component, an outer surface of the repair insert and an outer surface of the base component ending flush with one another.

20. The method according to claim 16, wherein:

the base component has a laminate structure which has at least the first component fiber ply and the second component fiber ply; and/or the repair insert has a laminate structure which has at least the first repair fiber ply and the second repair fiber ply.

* * * * *